Sept. 26, 1939.  L. POLETIS  2,174,389
TOOL FOR DRILLING CERAMIC MATERIALS
Filed June 21, 1938
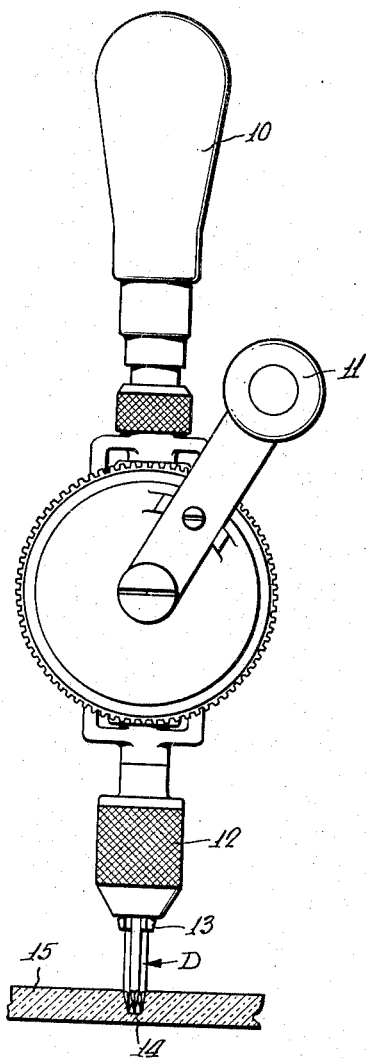
INVENTOR
Louis Poletis
BY
Harry Price
ATTORNEY Patented Sept. 26, 1939

2,174,389

UNITED STATES PATENT OFFICE 2,174,389

TOOL FOR DRILLING CERAMIC MATERIALS

Louis Poletis, New York, N. Y.

Application June 21, 1938, Serial No. 214,893

9 Claims. (Cl. 255—61)

The present invention relates to a drilling tool and it particularly relates to a tool which may be utilized for tile and similar ceramic materials.

Although the present invention will be particularly described in its application to tile, it is to be understood that it is also capable of general application to the drilling of similar ceramic materials, such as pottery and so forth, where it is desirable to make openings therein.

In drilling tile to permit the passage of electrical and water conduits therethrough or even to permit the attachment of screws and fastening devices, it has been found necessary to chip the tile with a center punch or other tempered steel device and laboriously to drill with a twist drill, designed for high speed duty, applied to the tile by hand and hammer. The chipping and drilling processes previously described were very slow and the labor costs were very high because of the time required and moreover the tile would often chip or crack in the process, requiring replacement or repair in the wall structure or other partition structure upon which the tile was placed.

With tempered steel drills, only slow progress could be made in drilling through the tile material and the tools would ordinarily lose their temper or burn after one or relatively few holes were made. Not only would these devices frequently result in breakage of the tile, but, in addition, even with the most careful workmanship and substantial expenditure of time, the glazed surface of the tile would tend to chip and fragment with formation of imperfections which would greatly decrease the life of the tile wall or partition.

It is among the objects of the present invention to provide an improved process of drilling or holing tile and an improved drill therefor, which will permit the formation of holes or openings in tile within short time without extended manual labor and with assurance that the tile structure will be substantially unweakened or only weakened to a minimum.

Another object is to provide an inexpensive, simple tool for drilling through tile and similar ceramic materials which may be repeatedly used and which will not necessitate laborious drilling or chipping and which will not require the use of tempered steel tools.

Other objects will be obvious or will appear during the course of the following specification.

In accomplishing the above objects it has been found most satisfactory according to one embodiment of the present invention to provide a relatively soft metal tool, preferably of the off-center type, which will have a combination of pyramidal cutting points, a smooth shank and a plurality of longitudinal removal grooves along the exterior of the shank.

In the preferred construction, the drill consists of a plurality of separated or integrated pointed members which have points at one end thereof, preferably based around the central point or symmetrically spaced without a central point, which members may be fashioned by recessing or grooving a solid cylindrical or polygonal rod member or which may be formed by placing together side by side or by twisting together individual rod-like members, either by welding, soldering or even by binding in other methods as by forcing them into a tubular holder.

In the preferred construction according to the present invention the structure of the integrated and/or individual elements is formed of a relatively soft metal material such as wrought iron or a slightly hardened copper alloy. Although wrought or drawn iron is preferred, it is possible that other suitable metals may be employed and in some instances a slightly tempered steel may also be utilized, but generally it is most desirable to avoid highly tempered materials.

In the drawing, which illustrates one of the preferred embodiments of the present invention, but to which the invention is by no means restricted, since many changes and alterations might be made, all within the scope of the invention of the present specification:

Fig. 1 is an elevational view showing a hand drill device merely by way of illustration, to which is attached the grinding bit or drilling device forming a particular part of the present invention, said drilling device being shown as penetrating into a tile section, Fig. 2 is an enlarged showing of the drilling device upon an enlarged scale as compared to Fig. 1 and removed from the ratchet device, Fig. 3 is a transverse sectional view upon the line 3—3 of Fig. 2 upon a somewhat enlarged scale as compared to Fig. 2, Fig. 4 is a bottom view of the drill structure as shown upon Fig. 2, Figs. 5, 6 and 7 show an alternative construction in which the elements are cut from a single member, Fig. 5 being an elevational view of a lower end of the drilling element, Fig. 6 being a transverse sectional view upon the line 6—6 of Fig. 5 and Fig. 7 being a bottom view of the element of Fig. 5, Figs. 6 and 7 being upon an enlarged scale as compared to Fig. 5, Fig. 8 is an elevational view of the lower end of an alternative construction of a drilling device upon an enlarged scale as compared to Figs. 2 and 5, Figs. 9 and 10 are respectively transverse sectional and bottom views of the device of Fig. 8 and the transverse sectional view of Fig. 9 being taken upon the line 9—9 of Fig. 8, Figs. 11 and 12 illustrate a further alternative embodiment where the elements are twisted together, Fig. 11 being an elevational view of the drilling device upon a small scale as compared to Figs. 2 and 5 and Fig. 12 being a transverse sectional view upon the line 12—12 of Fig. 11 upon an enlarged scale as compared to Fig. 11, Figs. 13, 14 and 15 illustrate alternative devices which may be formed respectively from 2, 5 and 7 separate elements.

Fig. 16 is a diagrammatic illustration of a piece of tile indicating how prick marks may be applied thereto to actuate the drilling operation.

Referring to Figs. 1 to 4, the tool is provided with a pressure handle 10, a turning handle 11 and with the usual turning clamp member 12 provided with the three jaws 13.

Any sort of a brace or turning device may be employed in connection with the drilling device of the present invention, to which the present invention is particularly directed.

In Fig. 1 is shown, in relatively small scale, the drilling device D which is penetrating into the tile body at 14 to form a hole in the tile body 15. As shown best on Figs. 2 to 4, the drilling device is provided with three cylindrical members 16, which may be welded or soldered together as indicated at 17 or which may be bound together, in other manners as by for example forcing them into a tube.

The ends of the rod member 16 are preferably pointed, as indicated at 18 and said points are made of pyramidal shape so as to present the cutting edges 19. The sides of the members form the grooves 20 which act to remove the dust and finely divided material formed as a result of the grinding operation.

It will be noted that the sides of the grooves coalesce with the smooth walls of the rod member 16, so that the only portion of the device which tends to cut into the tile are the sharp edges 19.

Although the material of the rod 16 may be made of various metal compositions, wrought or drawn iron or a relatively soft steel has been found to be most satisfactory and surprisingly the softness of the metal itself seems to lend to the increased speed of grinding and the tool will stand up much longer than a hard metal tool. Not only do hard metal drills cut more slowly after one or two applications, but they also loose their temper due to the generation of excessive heat. It appears that the grinding edges 19 act primarily in grinding and breaking the material of the hole, while the grooves 20 remove said material as soon as it is formed.

In applying the tool of Figs. 1 to 4 to the tile, three pricks 21 or two or four spaced pricks may be applied thereto by a prick punch, which are designed to engage the points 18 at the ends of the pyramids.

This will immediately center the hole and assure that the points will dig into the glazed face firmly without walking and will immediately cut through the glazed surface thereof.

The various rod members 16 may vary widely in dimension from $\frac{1}{64}$ inch to $\frac{1}{4}$ inch and the combined tool may vary from $\frac{1}{8}$ inch to $\frac{1}{2}$ inch, while the length of the tool may vary from $\frac{1}{2}$ inch to 3 inches. These dimensions are merely given by way of illustration, as it is obvious that many changes may be made in the preferred dimensions given above.

In Figs. 13, 14 and 15 are shown, respectively, two rods 16', five rods $16^2$ and seven rods $16^3$. The rods 16', $16^2$ and $16^3$ of these devices are soldered, welded, bound or otherwise connected together and are all provided with clearance grooves 20', $20^2$ and $20^3$ which are smooth edged and assure rapid removal of the ground material.

In the device of Figs. 5 to 7 instead of using discreet elements or rods 16, there is utilized a single round bar 22 into which may be cut the grooves 23 and the points 24 having the cutting edges 25. The points 24 are preferably spaced inside the exterior face of the rod 22, as are the points 18 in Fig. 2 and like Fig. 2 there is preferably no center point provided.

This tool may be utilized in the same manner as the tool utilized in Figs. 2 to 4. As a general rule it is not desirable to have a center point and where there is a central rod element, as indicated in Figs. 14, 15, this element may be cut short so that it will terminate inside of the outside points of the pyramids.

In Figs. 8 to 10 there is provided a central spacer element 26 having grooves 27 which receive the rods 28, said rods being pointed, as indicated at 29 and being provided with the cutting edges 30.

The central spacer element, as shown as also being provided with the point 31 having the cutting edges 32, but if desired, such spacer 26 may be cut short so that said point 31 does not project beyond the smooth shanks of the elements 28.

Generally where a center point element is utilized such as indicated in Fig. 8 or as such as also indicated in Figs. 14 and 15, this element may be of softer material so as to wear out more rapidly than the outside pointed elements.

In any case, however, it has been found most preferable in utilizing tools of the character so far described to have the points at all times at the same height so that they will all cut simultaneously and after from 10 to 20 or 30 holes the points may be resharpened, if desired, so that they will be all again at the same height.

Where the component elements 35 are of small diameter, as indicated at Fig. 11, they may be twisted as indicated at 36 so as to offer maximum strength and reinforcement when the drill is rotated in the direction as indicated at 37.

Of course other numbers, arrangements and diameters of elements may be used and the solid element, as indicated in Figs. 5 to 6 may be made with varying number of points, but for most practical purposes the three-point device, as shown in Figs. 2 and 5, has been found to be most desirable. Although the component elements 16, 16', $16^2$ and $16^3$ may be of other than circular cross section, but preferably the outside edges of the grooves 20, 20', $20^2$ and $20^3$ are at all times smoothed or rounded.

The device as shown may be utilized for cutting a large number of holes through tile and similar ceramic materials and even through marble or stone with maximum speed. The excessive labor and the necessity of tempered tools has been eliminated.

Although not desired, in some instances the cutting edges or surfaces of the tool may be surface or case hardened.

When used, the drill of the present invention may be rotated at a slow speed of the order of 60 to 80 revolutions per minute as compared to the normal speed of high speed machine drill of about 700 revolutions per minute.

Depending upon the character of the material which is being drilled, the tool may be used for a longer or shorter period, and in either case, the tool may be so inexpensively manufactured that it is susceptible to frequent replacement with a minimum of expense.

The tool may be utilized efficiently for short periods of time and then discarded for replacement by another identical tool at minimum expense, or it may be constructed for utility over relatively long periods of time, also at minimum expense, and in either case the job may be completed much more quickly by the present tool than with tempered tools of the character previously described.

Even where the tool is considered a temporary device it has many advantages over the old type of tools because of the speed of drilling, lack of expense, and great saving of labor.

Many other changes could be affected in the particular features of drilling tool designed, and in methods of operation set forth, and in specific details thereof, without substantially departing from the invention intended to be defined in the claims, the specific description herein merely serving to illustrate certain elements by which, in one embodiment, the spirit of the invention may be effectuated.

What is claimed is:

1. A drilling device for tile and similar materials having an elongated shank and a plurality of spaced cutting points, said device being formed of a relatively soft, substantially untempered metal and said shank being provided with a plurality of longitudinal grooves with rounded edges to remove the ground material from the points and said points being formed of sharp sided pyramids terminating in a common plane transverse to the axis of the device, the space centrally located between said points being blocked off so as not to receive the ground material from the points.

2. A drilling device for tile and similar materials having an elongated shank and a plurality of spaced cutting points, said device being formed of relatively soft wrought iron and said shank being provided with a plurality of longitudinal grooves with rounded edges to remove the ground material from the points and said points being formed of sharp sided pyramids terminating in a common plane transverse to the axis of the device, the space centrally located between said points being blocked off so as not to receive the ground material from the points.

3. A drilling device for tile and similar materials having an elongated shank and a plurality of spaced cutting points, said device being formed of a plurality of contacting individual rod-like elements, permanently connected together and said shank being provided with a plurality of longitudinal grooves with rounded edges to remove the ground material from the points and said points being formed of sharp sided pyramids terminating in a common plane transverse to the axis of the device, the space centrally located between said points being blocked off so as not to receive the ground material from the points.

4. A relatively soft, substantially untempered metallic drilling tool for drilling holes through tile and similar materials, said tool being made of a relatively soft metal, said tool comprising an elongated shank having a plurality of longitudinal grooves therein, the edges of said grooves being smooth and round, and a plurality of cutting points having sharp cutting edges and taking the form of pyramids, said cutting points being positioned around the central axis of the tool and inside of the outside periphery of the shank.

5. A relatively soft, substantially untempered metallic drilling tool for drilling holes through tile and similar materials, said tool being made of a relatively soft metal, said tool comprising an elongated shank having a plurality of longitudinal grooves therein, the edges of said grooves being smooth and round, and a plurality of cutting points having sharp cutting edges and taking the form of pyramids, said cutting points being positioned around the central axis of the tool and inside of the outside periphery of the shank, said points each being formed at the end of a separate individual rod and said rods being permanently united together in forming said tool.

6. A relatively soft, substantially untempered metallic drilling tool for drilling holes through tile and similar materials, said tool being made of a relatively soft metal, said tool comprising an elongated shank having a plurality of longitudinal grooves therein, the edges of said grooves being smooth and round, and a plurality of cutting points having sharp cutting edges and taking the form of pyramids, said cutting points being positioned around the central axis of the tool and inside of the outside periphery of the shank, said tool being formed of an integral metal structure.

7. A wrought iron twist drilling tool for drilling holes through the glazed surface of a tile upon application of the tool with pressure to a chipped surface thereof comprising an elongated shank having a plurality of longitudinal grooves therein, the edges of said grooves being smooth and round and a plurality of cutting points having sharp cutting edges and taking the form of pyramids, said cutting points being positioned symmetrically around the central axis of the tool and inside of the outside periphery of the shank.

8. A wrought iron twist drilling tool for drilling holes through the glazed surface of a tile upon application of the tool with pressure to a chipped surface thereof comprising an elongated shank having a plurality of longitudinal grooves therein, the edges of said grooves being smooth and round and a plurality of cutting points having sharp cutting edges and taking the form of pyramids, said cutting points being positioned symmetrically around the central axis of the tool and inside of the outside periphery of the shank, said shank being formed of a plurality of rod elements permanently connected together.

9. A wrought iron twist drilling tool for drilling holes through the glazed surface of a tile upon application of the tool with pressure to a chipped surface thereof comprising an elongated shank having a plurality of longitudinal grooves therein, the edges of said grooves being smooth and round and a plurality of cutting points having sharp cutting edges and taking the form of pyramids, said cutting points being positioned symmetrically around the central axis of the tool and inside of the outside periphery of the shank, said tool being formed from a wrought iron rod.

LOUIS POLETIS.